(12) United States Patent
Annapureddy et al.

(10) Patent No.: US 9,279,696 B2
(45) Date of Patent: Mar. 8, 2016

(54) AUTOMATIC HANDOVER OF POSITIONING PARAMETERS FROM A NAVIGATION DEVICE TO A MOBILE DEVICE

(71) Applicant: QUALCOMM Incorporated, San Diego, CA (US)

(72) Inventors: Koushik Annapureddy, Tampere (FI); Keir Finlow-Bates, Kangasala (FI)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/063,688

(22) Filed: Oct. 25, 2013

(65) Prior Publication Data

US 2015/0120183 A1    Apr. 30, 2015

(51) Int. Cl.
G01C 21/00    (2006.01)
G01C 21/36    (2006.01)
H04W 4/04    (2009.01)
G01C 21/34    (2006.01)

(52) U.S. Cl.
CPC ........ *G01C 21/3688* (2013.01); *G01C 21/3423* (2013.01); *G01C 21/362* (2013.01); *H04W 4/046* (2013.01)

(58) Field of Classification Search
USPC .......................................... 701/400, 421, 430
See application file for complete search history.

(56) References Cited

U.S. PATENT DOCUMENTS

| | | | |
|---|---|---|---|
| 5,819,227 A | 10/1998 | Obuchi | |
| 6,650,999 B1 | 11/2003 | Brust et al. | |
| 6,771,749 B1 * | 8/2004 | Bansal et al. | 379/88.17 |
| 7,050,834 B2 * | 5/2006 | Harwood et al. | 455/563 |
| 7,689,253 B2 * | 3/2010 | Basir | 455/563 |
| 7,787,907 B2 * | 8/2010 | Zeinstra et al. | 455/563 |
| 2003/0114202 A1 * | 6/2003 | Suh et al. | 455/569 |
| 2007/0123191 A1 * | 5/2007 | Simpson | 455/345 |
| 2009/0157583 A1 | 6/2009 | Couckuyt et al. | |
| 2012/0044091 A1 * | 2/2012 | Kim et al. | 340/932.2 |
| 2014/0100740 A1 * | 4/2014 | Chutorash et al. | 701/36 |
| 2015/0081218 A1 * | 3/2015 | Pang et al. | 701/537 |

FOREIGN PATENT DOCUMENTS

| | | |
|---|---|---|
| EP | 1030167 A1 | 8/2000 |
| EP | 1063494 A1 | 12/2000 |
| EP | 1302749 A2 | 4/2003 |
| EP | 1304548 A2 | 4/2003 |
| EP | 1593938 A1 | 11/2005 |
| JP | 2002181555 A | 6/2002 |

(Continued)

OTHER PUBLICATIONS

English Translation of Japanese Publication No. JP 2007-256137 A.*

(Continued)

*Primary Examiner* — Hussein A. Elchanti
(74) *Attorney, Agent, or Firm* — Berkeley Law & Technology Group, LLP (57) ABSTRACT

Example methods, apparatuses, or articles of manufacture are disclosed herein that may be utilized, in whole or in part, to facilitate or support one or more operations or techniques for automatic or more dynamic handover of one or more positioning parameters from a navigation device, such as a personal navigation device (PND) co-located with a vehicle, for example, to a mobile communication device for use in or with a mobile communication device.

34 Claims, 5 Drawing Sheets

(56) References Cited

FOREIGN PATENT DOCUMENTS

| | | | |
|---|---|---|---|
| JP | 2007256137 | A | 10/2007 |
| JP | 2007333711 | A | 12/2007 |
| JP | 2010060504 | A | 3/2010 |

OTHER PUBLICATIONS

Partial International Search Report—PCT/US2014/062073—ISA/EPO—Feb. 10, 2015.
International Search Report and Written Opinion—PCT/US2014/062073—ISA/EPO—Jun. 29, 2015.

\* cited by examiner

AUTOMATIC HANDOVER OF POSITIONING PARAMETERS FROM A NAVIGATION DEVICE TO A MOBILE DEVICE

BACKGROUND

1. Field

The present disclosure relates generally to position or location estimations of mobile communication devices and, more particularly, to automatic or, at times, more dynamic handover of one or more positioning parameters from a navigation device to a mobile communication device for use in or with mobile communication devices.

2. Information

Mobile communication devices, such as, for example, cellular telephones, personal digital assistants, electronic book readers, portable navigation units, laptop computers, or the like are becoming more common every day. As geographic barriers to personal travel decrease, mobile communication devices play a role in allowing society to maintain its mobility. Continued advancements in information technology, communications, mobile applications, or the like help to contribute to a rapidly growing market for mobile communication devices, which have become ubiquitous and may already be viewed as "extensions of the hand" altering the manner in which society communicates, does business, or creates value.

Certain mobile communication devices may, for example, feature a location-aware capability to assist users in estimating their geographic locations by providing position information obtained or gathered from various systems. For example, a mobile communication device may obtain a location estimate or so-called "position fix" by acquiring wireless signals from a satellite positioning system (SPS), such as the global positioning system (GPS) or other like Global Navigation Satellite System (GNSS), cellular base station, location beacon, or the like via a cellular telephone or other wireless communications network. Received wireless signals may, for example, be processed by or at a mobile communication device, and its location may be estimated using one or more appropriate techniques, such as, for example, Advanced Forward Link Trilateration (AFLT), base station identification, or the like.

Certain location-aware mobile communication devices, such as personal navigation devices (PNDs), for example, may feature a navigation capability so as to assist users in navigating or traveling to a location of interest by providing navigation instructions via a displayed electronic digital map, voice prompts, schematic pictograms, or the like. At times, a PND may comprise, for example, or be a part of an automotive navigation system. For example, an in-vehicle PND may be capable of overlaying its current location over a displayed street map so as to provide a user with a proposed route to a suitable destination along one or more designated or existing streets. An in-vehicle PND may also provide a user with additional context, frame of reference, or the like. For example, a displayed street map may show points of interest, such as gas stations, public parking, shopping malls, hotels, restaurants, etc.

At times, an in-vehicle PND may be capable of handling or processing vehicle-related information or functions, such as, for example, driving-related information, safety-related information, entertainment functionalities, or the like. Certain factory-embedded in-vehicle PNDs, however, cannot be taken out of a vehicle or suitably operated as stand-alone devices, such as if a user desires to continue using such a PND while navigating on foot via a pre-planned route, for example. Thus, in some instances, a user may need to restart a positioning or navigation application on another mobile device, manually reenter a current or target location, download a new pedestrian navigation route, or the like. This may, for example, be inconvenient, time-consuming, or error-prone.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Example implementations relate to automatic or more dynamic handover of one or more positioning parameters from a navigation device to a mobile communication device for use in or with a mobile communication device. In one implementation, a method may comprise executing one or more navigation applications to direct movement of a personal navigation device (PND) co-located with a vehicle to a final destination; and at a sub destination, handing over to a mobile device one or more positioning parameters to enable the mobile device to navigate movement of the mobile device from the sub destination to the final destination, the handing over is being triggered in response to a determination that the vehicle has parked.

In another implementation, an apparatus may comprise a communication interface to communicate with a mobile device; and at least one processor programmed with instructions to execute one or more navigation applications to direct movement of a personal navigation device (PND) co-located with a vehicle to a final destination; and at a sub destination, hand over to the mobile device one or more positioning parameters to enable the mobile device to navigate movement of the mobile device from the sub destination to the final destination, the handing over is being triggered in response to a determination that the vehicle has parked.

In yet another implementation, an apparatus may comprise means for executing one or more navigation applications to direct movement of a personal navigation device (PND) co-located with a vehicle to a final destination; and means for handing over to a mobile device, at a sub destination, one or more positioning parameters to enable the mobile device to navigate movement of the mobile device from the sub destination to the final destination, the handing over is being triggered in response to a determination that the vehicle has parked.

In yet another implementation, an article may comprise a non-transitory storage medium having instructions stored thereon executable by a special purpose computing platform to execute one or more navigation applications to direct movement of a personal navigation device (PND) co-located with a vehicle to a final destination; and at a sub destination, hand over to a mobile device one or more positioning parameters to enable the mobile device to navigate movement of the mobile device from the sub destination to the final destination, the handing over is being triggered in response to a determination that the vehicle has parked. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques for automatic or more dynamic handover of one or more positioning parameters from a navigation device, such as an in-vehicle PND, for example, to a mobile communication device. As used herein, "mobile device," "mobile communication device," "location-aware mobile device," or the plural form of such terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices (PNDs), or the like. It should be appreciated, however, that these are merely examples of mobile devices that may be used, at least in part, to implement one or more operations or processes for generating a geofence via one or more techniques described herein, and that claimed subject matter is not limited in this regard. It should also be noted that the terms "position" and "location" may be used interchangeably herein.

As alluded to previously, an in-vehicle PND, such as a PND co-located with an automobile or vehicle, for example, may provide advantages over certain stand-alone PNDs. For example, at times, an in-vehicle PND may comprise a so-called "infotainment console" (e.g., all-in-one device, etc.) capable of handling or processing in-vehicle information, such as navigation information, driving-related information, safety information, vehicle performance information, entertainment functionalities, or the like. In-vehicle PND may also feature more robust electronic digital maps, bigger screens or displays, more superior GPS technology, or more sophisticated or customizable user interfaces than, for example, stand-alone PNDs. In addition, in-vehicle PNDs may rely less on cellular communications infrastructure, thus, reducing cellular network costs for a user, may provide an uninterrupted navigation experience (e.g., no incoming calls, etc.), and may reduce driver distraction by offering voice activated navigation. Of course, these are merely examples relating to in-vehicle PNDs, and claimed subject matter is not so limited. The terms "in-vehicle PND," "PND co-located with a vehicle," or simply "PND" may be used interchangeably herein and may refer to a device that may or may not be removable from a vehicle.

Typically, an in-vehicle PND may use GPS or other SPS technology to obtain periodic position fixes via a suitable positioning technique (e.g., trilateration, etc.). A PND may be programmed or inputted with a desired destination (e.g., by a user, etc.) and may plot obtained GPS position fixes in a trajectory over a displayed electronic digital map, such as to assist in navigating a vehicle to that destination, for example. Thus, a PND may comprise a receiver capable of acquiring wireless signals transmitted, for example, by SPS satellites and may employ one or more positioning parameters or assistance data, such as ephemeris data, satellite almanac data, time information, or the like to assist with navigation. An example of a PND that may be used, in whole or in part, to facilitate of support one or more processes or operation discussed herein will be described in greater detail below with reference to FIG. 4.

As was also indicated, in some instances, an in-vehicle PND may be capable of providing a user with additional context or information. For example, a PND may display locations or provide a list of available parking garages, lots, spots or spaces, etc. for a selected final destination, just to illustrate one possible implementation. To illustrate, a user may, for example, input or select a final destination via a PND on an electronic digital map, via drop-down menu, input fields, etc., and the PND may display or provide an option of navigating to one or more sub destinations, such as parking garages, lots, spaces, etc. nearby the final destination. As used herein, "final destination" may refer to an intended or desired end point of a navigation route or journey, for example, and "sub destination" may refer to a reference or way point in a suitable proximity to a final destination. By way of example but not limitation, a final destination may comprise, for example, a shopping mall or restaurant, and a sub destination may comprise, for example, a nearby parking garage or space. Claimed subject matter is not so limited, of course.

In some instances, such as if a user selects a displayed parking spot via an in-vehicle PND, for example, the PND may designate that parking spot as a final destination rather than as a sub destination. Once parked at a selected parking spot, then, a user may typically navigate to an actual final destination on foot. At times, a parking spot may be relatively far way from a final destination, for example, or the final destination may not be visible from the parking spot. As such, in some instances, it may be rather difficult for a pedestrian user to travel or navigate to a final destination from a sub destination, particularly if the final destination is hidden behind or obscured by buildings, flyovers, underpasses, or the like. Thus, at times, it may be useful for a pedestrian user to carry or employ a navigation device for a final leg of a journey. Certain in-vehicle PNDs, however, may not be removable from a vehicle (e.g., factory-embedded, etc.) or may have limited power resources (e.g., a shorter battery life, etc.) not be capable of longer or suitable stand-alone utilization.

Thus, at times, to continue navigating a final leg of a journey on foot, a user may start a pedestrian navigation application on another mobile device, such as a smart telephone, for example, manually set or select a parking spot as a source destination, reenter a final destination, recalculate or accept a new or alternate pedestrian route, or the like. In this context, a smart telephone may refer to any suitable location-aware mobile device featuring a navigation or like capability, for example. Restarting a new application, reentering a final or sub destination, etc. may negatively impact user navigation experience, as previously mentioned. For example, an SPS receiver at a mobile device at a cold start may take more time to get an initial position fix, thus, affecting timing of an initial location estimate. In addition, quality of service of an SPS receiver may, for example, be compromised, battery life of a mobile device may be shortened, or the like. Accordingly, it may be desirable to develop one or more methods, systems, or apparatuses that may enable or otherwise improve navigation services, such as in connection with an in-vehicle PND, for example.

Thus, as will be described in greater detail below, in an implementation, a state of a vehicle and a final destination metric may be monitored or weighted, such as by an in-vehicle PND, for example. In some instances, a state of a vehicle may comprise, for example, information with respect to vehicle's direction or speed of travel, open position of vehicle's doors, just to name a few examples, and a final destination metric may include, for example, information with respect to a range of a PND to a final destination, geographic coordinates of a final destination, or the like. Weighted information may be combined in some manner, and a confidence-in-parking level representative of a determination that a vehicle has parked may, for example, be assessed. For example, in some instances, a confidence-in-parking level may be compared against a suitable threshold. Based, at least in part, on a confidence-in-parking level, handover of one or more positioning parameters form an in-vehicle PND to a mobile device, such as a smart telephone, for example, may be initiated or triggered.

As will also be seen, at times, handover of one or more positioning parameters from an in-vehicle PND to a suitable mobile device may be initiated or triggered automatically or, at times, more dynamically, such as with no or little user input, for example, though claimed subject matter is not so limited. For example, in some instances, handover may be initiated or triggered in response to a user selection received at a user interface of an in-vehicle PND or mobile device (e.g., via a touch screen, voice command, etc.). Once handover is complete, a pedestrian navigation application may be launched or started, such as, for example, automatically on a mobile device capable of being carried by a user (e.g., a smart telephone, etc.). A pedestrian navigation application may, for example, provide navigation details for a final leg of a journey, thus, enabling a mobile device to navigate movement of an associated user from a sub destination to a final destination. As such, automatic or more dynamic handover of positioning parameters may facilitate or support more effective or efficient navigation, which may lead to a better user experience. As also discussed, in some instances, handover of one or more positioning parameters may be implemented in connection with a geofence, such as indicative of an acceptable walking distance to a final destination, for example.

Figure 1:
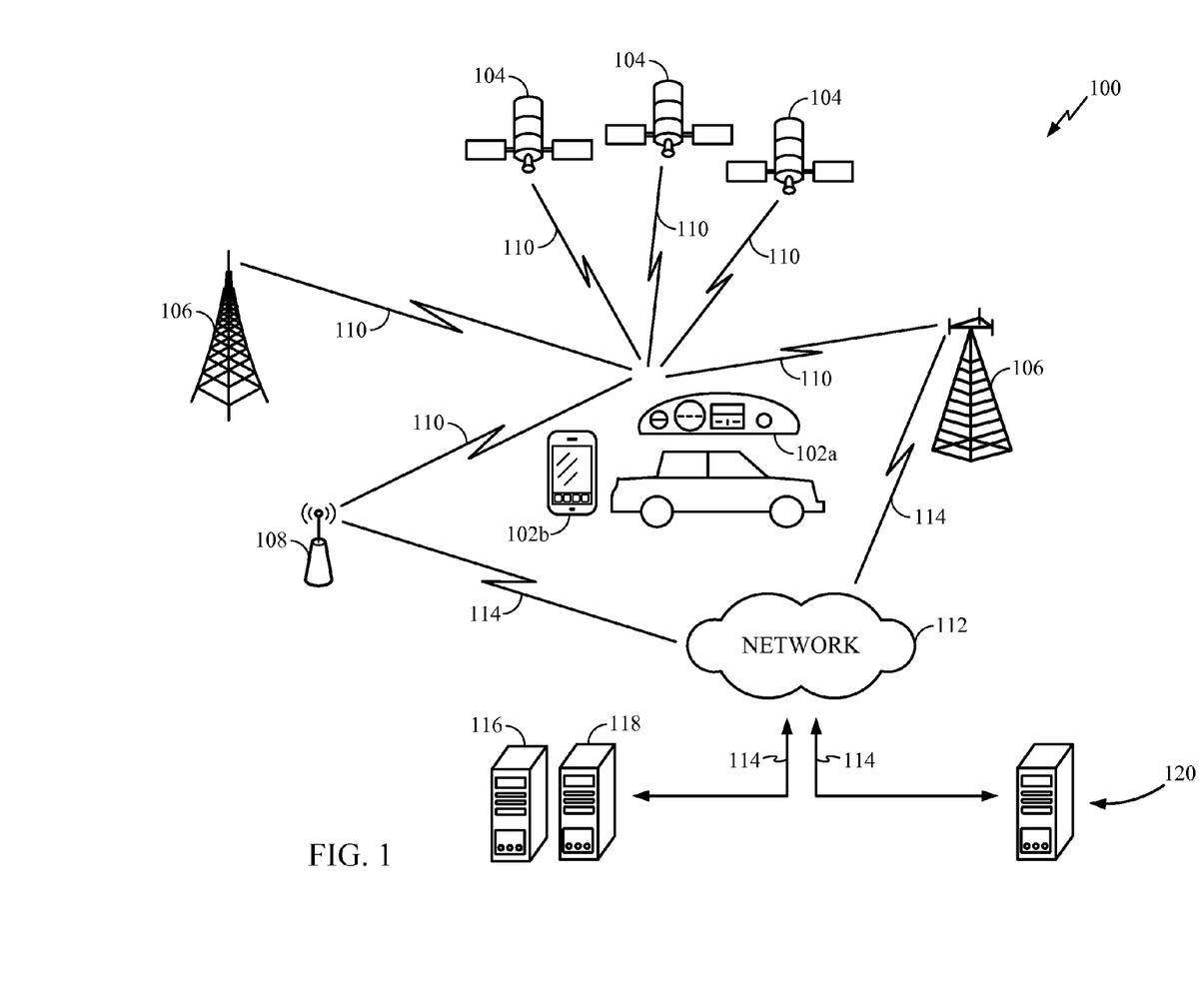
FIG. 1 is a schematic diagram illustrating features associated with an implementation of an example operating environment.

FIG. 1 is a schematic diagram illustrating features associated with an implementation of an example operating environment 100 capable of facilitating or supporting one or more processes or operations for automatic or more dynamic handover of one or more positioning parameters from a navigation device, such as an in-vehicle PND 102*a*, for example, to a suitable mobile device 102*b*, such as a smart telephone, for example. It should be appreciated that operating environment 100 is described herein as a non-limiting example that may be implemented, in whole or in part, in the context of various communications networks or combination of networks, such as public networks (e.g., the Internet, the World Wide Web), private networks (e.g., intranets), wireless local area networks (WLAN), wireless wide area networks (WWAN), mobile ad-hoc networks (MANET), wireless mesh networks (WMN), wireless sensor networks (WSN), wireless personal area network (WPAN), or the like. Operating environment 100 may, for example, be communicatively enabled using one or more special purpose computing platforms, communication devices, information storage devices, databases, computer-readable codes or instructions, e-mail or text messaging information, specific applications or functionalities, various electrical or electronic circuitry or components, etc., as described herein with reference to one or more example implementations.

As illustrated, operating environment 100 may comprise, for example, one or more satellites 104, base transceiver stations 106, wireless transmitters 108, etc. capable of communicating with PND 102*a* or mobile device 102*b* via wireless communication links 110 in accordance with one or more communication protocols. Satellites 104 may be associated with one or more satellite positioning systems (SPS), such as, for example, the United States Global Positioning System (GPS), the Russian GLONASS system, the European Galileo system, as well as any system that may utilize satellites from a combination of satellite systems, or any satellite system developed in the future. Base transceiver stations 106, wireless transmitters 108, etc. may be of the same or similar type, for example, or may represent different types of devices, such as access points, radio beacons, cellular base stations, femtocells, or the like, depending on an implementation. At times, one or more wireless transmitters, such as wireless transmitters 108, for example, may be capable of transmitting as well as receiving wireless signals.

In some instances, one or more base transceiver stations 106, wireless transmitters 108, etc. may, for example, be operatively coupled to a network 112 that may comprise one or more wired or wireless communications or computing networks or resources capable of providing suitable information, such as via one or more wireless communication links 114, 110, etc. Information may include, for example, one or more positioning parameters, navigation instructions or tasks, geofence-related parameters (e.g., a location, boundary, etc. of a geofence), estimated location of PND 102*a* or mobile device 102*b* (e.g., a GPS position fix, etc.), digital map-related information, or the like. At times, information may include, for example, geographic coordinates of a final destination or sub destination, ephemeris data, SPS almanac data, time estimate, proposed route from a sub destination to a final destination, etc., as will be seen.

Although not shown, at times, one or more wireless communication links may, for example, be established between PND 102*a* and mobile device 102*b*, such as to facilitate or support handover of one or more positioning parameters, for example, as discussed below. In some instances, one or more wireless communication links established between these devices may comprise, for example, peer-to-peer-type communication links. As used herein, "peer-to-peer-type communication link" may refer to one or more wireless signals that may be communicated directly between peer devices, such as, for example, without utilizing a cellular or like wireless communications network. As a way of illustration, one or more peer-to-peer-type communication links may be a part of a short-range wireless communications network, such as, for example, a Bluetooth®-type network, a Home Radio Frequency (RF)-type network, a ZigBee®-type network, an active Radio-Frequency Identification (RFID)-type network, an RF-type network (e.g., ultra-wide band (UWB), Wi-Fi, etc.), a Near Field Communication (NFC)-type network, etc., or any combination thereof. Of course, these are merely examples relating to wireless communication links, and claimed subject matter is not so limited. For example, in some instances, a cellular or like wireless communications network may be utilized, at least in part, to facilitate or support handover of one or more positioning parameters from PND 102*a* to mobile device 102*b*. At times, one or more positioning parameters may, for example, be handed over from PND 102*a* to mobile device 102*b* via a suitable wired communication link or connection (e.g., a cable, etc.), just to illustrate another possible implementation.

As was indicated, in some instances, PND 102*a* may employ a geofence bounding a region of interest within operating environment 100 so as to detect entries into or exits from the region in conjunction with one or more GPS or like GNSS position fixes obtained via a suitable positioning technique. The terms "GPS position fix," "GNSS position fix," "position fix," or the like may be used interchangeably herein. A geofence may comprise, for example, a virtual perimeter on a geographic area established in connection with a suitable location-based service (LBS), such that if PND 102*a* enters or exits the perimeter a notification is generated or provided. A notification may be provided via an e-mail, text or voice message, or other communication and may comprise, for example, position fix of PND 102*a*, time of crossing a geofence boundary or so-called geofence breach, whether a geofence is breached from the inside or outside, or the like. Geofences are generally known and need not be described here in greater detail. As will be seen, in at least one implementation, detection of a geofence breach may, for example, be used, at least in part, to inform or notify a user of in-vehicle PND 102*a* that a vehicle (and the user) is within a walking distance of a final destination.

In an implementation, network 112 may be capable of facilitating or supporting communications between or among suitable computing platforms or devices, such as, for example, PND 102*a*, mobile device 102*b*, one or more satellites 104, base transceiver stations 106, wireless transmitters 108, etc., as well as one or more servers associated with operating environment 100. In some instances, servers may include, for example, a location server 116, geofence data server 118, as well as one or more other servers, indicated generally at 120 (e.g., navigation, information, map, etc. server), capable of facilitating or supporting one or more operations or processes associated with operating environment 100. Location server 116 may, for example, provide a position fix with respect to PND 102*a* or mobile device 102*b*, such as by acquiring wireless signals from satellites 104, base transceiver stations 106, wireless transmitters 108, etc. using one or more appropriate techniques (e.g., AFLT, etc.).

In some instances, location server 116 may provide positioning assistance data including, for example, one or more positioning parameters, such as ephemeris data, satellite almanac data, time information, etc. (e.g., via assisted GPS or GNSS, Secure User Plane Location (SUPL) protocol, etc.). Optionally or alternatively, one or more positioning parameters may, for example, be provided via one or more satellites 104, base transceiver stations 106, or the like. At times, location server 116 may provide geographic coordinates of a final destination or sub destination, for example. Geofence data server 118 may be used, at least in part, by PND 102*a* to obtain suitable geofence-related information (e.g., a location, perimeter, etc. of a geofence) that may, for example, be used, at least in part, in connection with geofence breach detection. Server 120 may provide suitable navigation details, such as a proposed route, turn-by-turn instructions, etc., an electronic digital map, or other suitable information (e.g., street names, gas stations, public parking, etc.) for a vehicle's surrounding geographic location, final or sub destination, or the like.

It should be appreciated that even though a certain number or type of computing platforms or devices are illustrated herein, any number or type of computing platforms or devices may be implemented herein to facilitate or support one or more techniques or processes associated with operating environment 100. At times, network 112 may, for example, be coupled to one or more other wired or wireless communications networks (e.g., Wi-Fi, WLAN, WWAN, etc.) so as to enhance a coverage area for communications with PND 102*a* or mobile device 102*b*, one or more base transceiver stations 106, wireless transmitters 108, servers 116, 118, or 120, etc. For example, in some instances, network 112 may facilitate or support femtocell-based or like operative regions of coverage, just to illustrate one possible implementation. Again, operating environment 100 is merely an example, and claimed subject matter is not limited in this regard.

Figure 2:
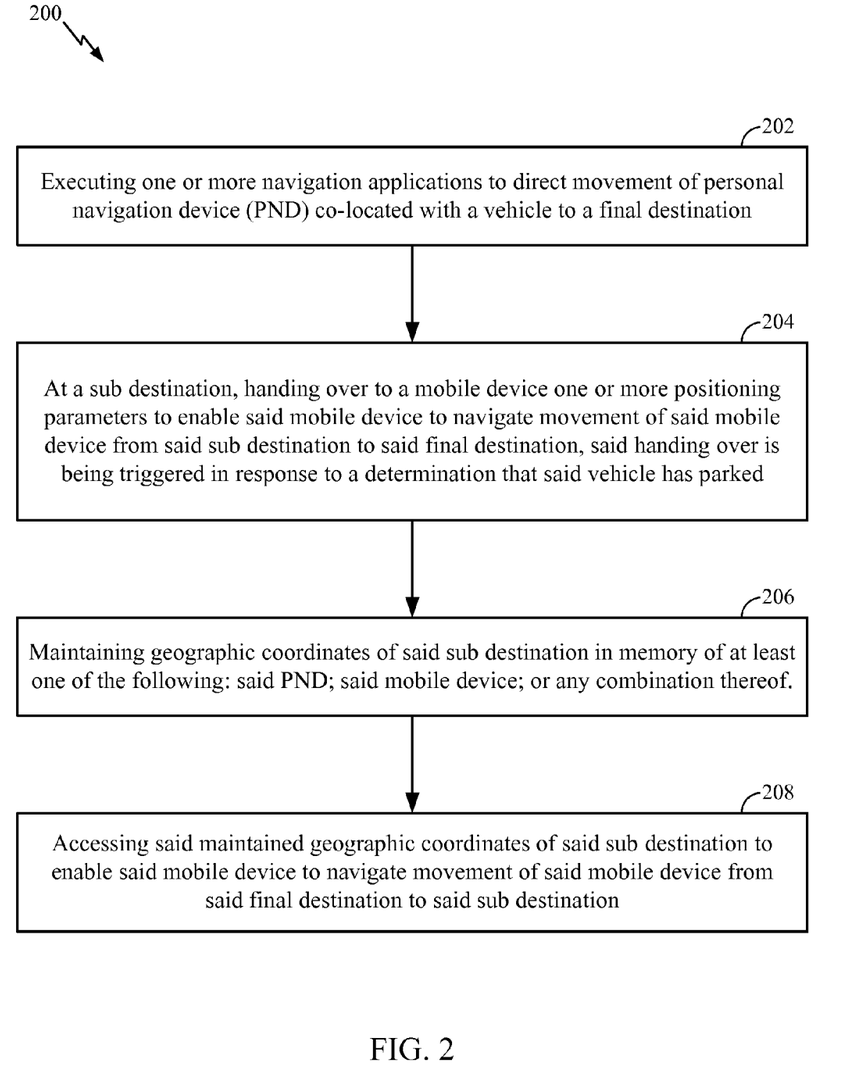
FIG. 2 is a flow diagram illustrating a summary of an implementation of an example process for automatic or more dynamic handover of one or more positioning parameters from a PND to a mobile device.

With this in mind, attention is now drawn to FIG. 2, which is a flow diagram illustrating an implementation of an example process 200 that may be performed, in whole or in part, to facilitate or support one or more operations or techniques for automatic or more dynamic handover of one or more positioning parameters from a navigation device, such as PND 102*a* of FIG. 1, for example, to a suitable mobile device, such as mobile device 102*b* of FIG. 1, for example. As was indicated, a suitable mobile device may comprise any location-aware mobile device featuring a navigation or like capability, such as a smart telephone, for example. It should be noted that information acquired or produced, such as, for example, input signals, output signals, operations, results, etc. associated with example process 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 200 may, for example, begin at operation 202 with executing one or more navigation applications to direct movement of a PND co-located with a vehicle (e.g., PND 102*a* of FIG. 1, etc.) to a final destination. As was indicated, a PND may be programmed or inputted with a desired final destination, such as by a user or driver of an associated vehicle, for example. An in-vehicle PND may, for example, execute a suitable navigation application so as to plot obtained GPS position fixes in a trajectory over a displayed electronic digital map using one or more appropriate techniques. The terms "user" and "driver" may be used interchangeably herein. A final destination may, for example, be programmed or inputted via a user interface of an in-vehicle PND, such as by making a selection on an electronic digital map, via a drop-down menu, input field, or the like. In some instances, such as if applicable or desired, along with selecting a final destination, a user may enable or activate a handover feature so as to facilitate or support handing over of one or more positioning parameters from a PND to a wirelessly connected mobile device (e.g., mobile device 102*b* of FIG. 1, etc.). For example, a handover feature may be enabled or activated via a user interface of an in-vehicle PND, just to illustrate one possible implementation. Claimed subject matter is not so limited, of course. In some instances, a handover feature may, for example, be enabled or activated without additional or specific user input, such as by simply selecting or choosing a final destination.

As previously mentioned, at times, an in-vehicle PND may display an indication (e.g., a map icon, text, etc.) of a parking garage or parking space nearby a final destination, for example, which a user may select or set as a sub destination, if available or otherwise useful. At times, an option of selecting a sub destination may not be useful, such as if the sub destination is located outside of an acceptable walking distance to a final destination, for example. Thus, in some instances, a navigation application may employ or define a geofence, such as around a final destination, for example. In at least one implementation, a geofence may, for example, be defined as having a final destination at its center, though claimed subject matter is not so limited. At times, a range or perimeter of a geofence may be set by a user, for example, and may be dependent on a distance the user is willing to walk. As a way of illustration, a younger or more fit person may select a longer walking range to a final destination (e.g., 500 meters, etc.), for example, and an elderly or infirm user may select a shorter walking range (e.g., 100 meters, etc.). Again, claimed subject matter is not so limited.

Figure 3:
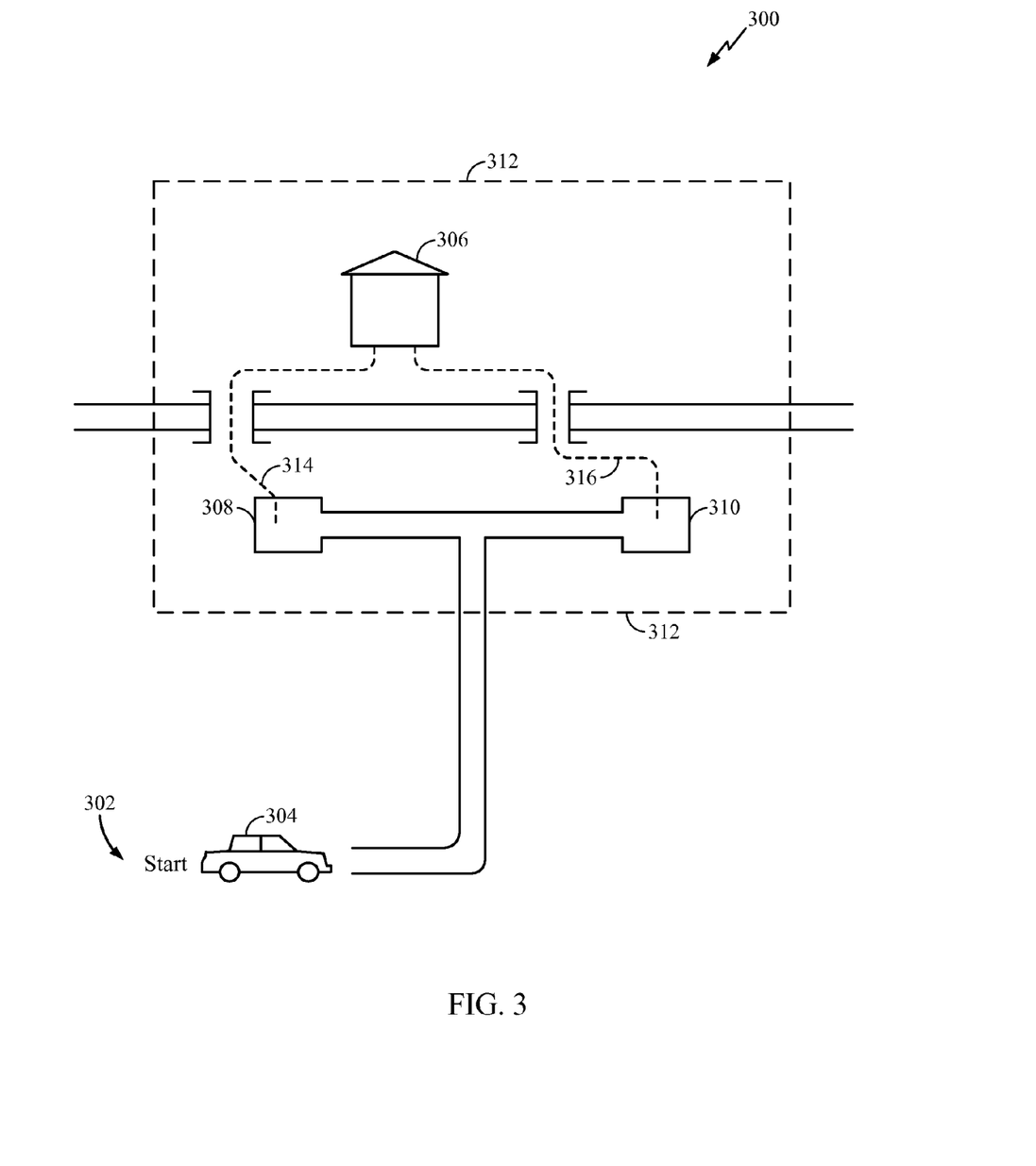
FIG. 3 is a schematic illustration of an implementation of an example use case of automatic or more dynamic handover of one or more positioning parameters from a PND to a mobile device.

For example, as illustrated in an implementation of an example use case or scenario 300 of FIG. 3, at the beginning of a navigation route or journey, indicated generally via an arrow at 302, a user of a PND co-located with a vehicle 304 may program or input a final destination 306, enable or activate a handover feature, etc., such as discussed above. In some instances, if applicable or useful, a user may also select a sub destination, such as a suitable parking space or spot among one or more parking spaces or spots 308 or 310, for example. As seen, at times, final destination 306 may not be visible, such as from parking spaces or spots 308 or 310 (e.g., obscured by flyovers, overpasses, etc.), for example. Optionally or alternatively, such as instead of selecting a particular parking spot via a PND, for example, or if such an option is not available or useful, a user may attempt to find a parking spot while in a sufficiently close proximity to final destination 306. As was indicated, for this purpose, a user may, for example, employ a geofence 312 with a virtual boundary that may be indicative of an acceptable walking distance to final destination 306. Thus, if vehicle 304 breaches geofence 312, an in-vehicle PND may, for example, provide a notification that a user is within an acceptable walking distance of final destination 306. Accordingly, a user may start looking for a place to park vehicle 304. It should be noted that even though a rectangular geofence is illustrated, any suitable type of a geofence (e.g., circular, three-dimensional, etc.) may be used, in whole or in part.

Since a breach of geofence 312 may indicate that a user of vehicle 304 is getting sufficiently close to final destination 306, in at least one implementation, handover of certain one or more positioning parameters (e.g., known, suitable, etc.) from a PND to a user's navigation-capable mobile device may, for example, be initiated or triggered. For example, here, handover of geographic coordinates of final destination 306, ephemeris data, SPS almanac data, or estimate of time may be triggered, such as automatically or without user input, though claimed subject matter is not so limited. As discussed above, here, any suitable wireless communication link (e.g., short-range, cellular, etc.) or wired link or connection (e.g., a cable, etc.) may be utilized, in whole or in part. In some instances, handover of one or more positioning parameters may, for example, be triggered in response to a user selection received at a user interface of an associated PND or mobile device, just to illustrate another possible implementation. Handover of one or more positioning parameters prior to reaching a sub destination may provide advantages. For example, timing of an initial position fix at a sub destination may be improved (e.g., no cold start, etc.), handover of other positioning parameters at a sub destination may be shortened (e.g., via reduced communications with an SPS or network, etc.), or the like. Of course, details relating to handover of positioning parameters or benefits are merely examples to which claimed subject matter is not limited. At times, handover of all or most suitable positioning parameters may, for example, be initiated or triggered at a sub destination, just to illustrate another possible implementation.

In some instances, such as at the time of a breach of geofence 312, for example, certain positioning parameters may not yet be known, suitable, or otherwise useful so as to be handed over to a user's mobile device. For example, a parking spot, such as 308 or 310, initially selected or otherwise, may be occupied by another vehicle, under construction, inaccessible, etc. As such, at times, there may be uncertainty regarding one or more positioning parameters, such as, for example, geographic coordinates of a sub destination (e.g., an actual parking spot is yet to be determined, etc.), a proposed route from a sub destination to a final destination, pedestrian navigation details, or the like. To illustrate, for this example, at the time of a breach of geofence 312, depending on an availability of parking spots 308 or 310, a user may be unsure which pedestrian navigation route, such as 314 or 316, for example, to take to final destination 306. Accordingly, at times, to initiate or trigger handover of one or more positioning parameters, it may be useful to determine, such as with certain confidence, for example, that vehicle 304 has parked or is about to be parked at a sub destination.

Referring back to process 200 of FIG. 2, with regard to operation 204, at a sub destination, one or more positioning parameters may, for example, be handed over to a mobile device to enable the mobile device to navigate movement of the mobile device from the sub destination to the final destination, the handing over is being triggered in response to a determination that the vehicle has parked. For example, as previously mentioned, an in-vehicle PND may be capable of handling or processing information associated with a vehicle as well as final destination including on-board diagnostics data with parameters that may be representative of a state of the vehicle as well as one or more final destination metrics (e.g., via various events occurring in or at the vehicle, etc.). To illustrate, via communications with respective sensors, an in-vehicle PND may, for example, detect or determine that the PND is within a certain range to a final destination, that a parking brake of a vehicle has been applied, driver's or passenger's door has been opened, engine has been turned off, or the like. Particular examples of various states of a vehicle and final destination metrics will be described in greater detail below.

In an implementation, a determination that a vehicle has parked may, for example, be performed as part of or in connection with assessment of a confidence-in-parking level for the vehicle. As alluded to previously, in some instances, a confidence-in-parking level may indicate, such as with certain confidence, for example, that a vehicle has parked or is about to be parked at a sub destination. For example, a state of a vehicle and one or more final destination metrics may be weighted and combined to determine if a confidence-in-parking level meets some threshold. Likewise, here, on-board diagnostics data with one or more parameters representative of various respective events occurring in or at an associated vehicle may be utilized, in whole or in part. By way of example but not limitation, in one particular simulation or experiment, parameters representative of various events included those listed below, though claimed subject matter is not so limited. As also illustrated, at times, a parameter may correspond to a predefined numerical value, such as a negative or positive numerical value, for example, and may be expressed via a percentage or any other suitable value. Thus, consider:

A set range of an in-vehicle PND to a final destination: +20%. To illustrate, this parameter may be used, at least in part, if a vehicle is within 100, 200, etc. meters of a final destination, for example.

A set range of a vehicle to one or more of a traffic light and a traffic sign: (−20%). To illustrate, this parameter may be represented via a negative value and may be used, at least in part, if a vehicle is within 10, 15, etc. meters of a traffic light, stop sign, stop light, etc., for example.

A reverse direction of travel of a vehicle: +20%. To illustrate, this parameter may be used, at least in part, if a vehicle has been driven in reverse for a short distance, such as 2 meters or less, for example, before stopping.

A low speed of travel of a vehicle: +10%. To illustrate, this parameter may be used, at least in part, if a vehicle has been moving slower than 0.2 meters per second, for example.

A stationary state of a vehicle: +30%. To illustrate, this parameter may be used, at least in part, if a vehicle has stopped outside of a 10 meter-range to a traffic light, stop sign, stop light, etc., for example (e.g., a speed is 0 meters per second).

A non-operational state of an engine of a vehicle: +50%. To illustrate, this parameter may be used, at least in part, if a vehicle's engine has been turned off, for example. Here, a battery-backed up or operated in-vehicle PND may be employed, if applicable.

An open position of a driver's door of a vehicle: +40%. To illustrate, this parameter may be used, at least in part, if a front driver's door has been opened, for example.

An open position of a passenger's door of a vehicle: +25%. To illustrate, this parameter may be used, at least in part, if any door of a vehicle other than a driver's door has been opened, for example.

An application of a parking brake of a vehicle: +50%. To illustrate, this parameter may be used, at least in part, if a parking brake has been engaged or applied, for example. At times, a detection of an application of a parking brake alone may indicate, such as with sufficient confidence, for example, that an associated vehicle has been parked at a sub destination. As such, here, handover of one or more positioning parameters may, for example, be initiated or triggered. For example, geographic coordinates of a sub destination (e.g., an actual parking spot, etc.), a proposed route from a sub destination to a final destination, pedestrian navigation details, etc. may be handed over from a PND to a mobile device of a user. Optionally or alternatively, geographic coordinates of a final destination, ephemeris data, SPS almanac data, estimate of time, or like positioning parameters may also be handed over in response to a detection of an application of a parking brake (e.g., if not previously handed over). For purposes of explanation, a parking brake may comprise any suitable type of a brake, such as, for example, a hand-operated parking brake, a foot-operated parking brake, a voice-operated parking brake, a motion-operated parking brake, a remotely-operated parking brake, etc., or any combination thereof. As was indicated, as soon as handover of suitable positioning parameters is complete, a mobile device may, for example, automatically launch a pedestrian navigation application to enable the mobile device to navigate movement of the mobile device from a sub destination to a final destination. Of course, these are merely details relating to handover of one or more positioning parameters in connection with a detection of an application of a parking brake, and claimed subject matter is not so limited. For example, if suitable or desired, in some instances, weighted parameters may be combined so as to further assess a confidence-in-parking level, as discussed below.

Thus, information representative of a state of a vehicle and one or more final destination metrics may be monitored or weighted, such as by determining whether such information satisfies at least one parameter corresponding to a predefined numerical value, such as illustrated above, for example. Weighted parameters may be combined and a confidence-in-parking level may be assessed, such as by comparing, for example, a sum or total of predefined numerical values of combined parameters against some threshold, just to illustrate one possible implementation. If a confidence-in-parking level meets a threshold, it may be inferred, such as with certain confidence, for example, that an associated vehicle has parked or is about to be parked at a sub destination. A threshold may be determined, at least in part, experimentally and may be pre-defined or configured, for example, or otherwise dynamically defined in some manner depending on a particular vehicle, PND, or the like. By way of example but not limitation, in one particular simulation or experiment, it appeared that a threshold in a range between 80% and 90% may prove beneficial for assessing a confidence-in-parking level.

As a way of illustration, if it is detected that a vehicle, while within a set range to a final destination, has been driven at a low speed, has been reversed for a short distance, and then stopped outside of a 10 meter-range to a traffic light, stop sign, stop light, etc, it may be inferred, such as with certain confidence, for example, that the vehicle has parked or is about to be parked, or:

$$20\% + 10\% + 20\% + 30\% = 80\% \text{ (threshold)}$$

Accordingly, here, handover of one or more positioning parameters may be initiated or triggered, such as discussed above, for example. One or more positioning parameters may, for example, enable a mobile device to navigate movement of the mobile device from a sub destination (e.g., parking spot 308, 310, etc. of FIG. 3, etc.) to a final destination (e.g., final destination 306 of FIG. 3, etc.). In some instances, one or more positioning parameters that have been handed over prior to reaching a sub destination (e.g., at the time of a geofence breach, etc.) may be updated based, at least in part, on an assessed confidence-in-parking level. Updated parameters may be utilized, in whole or in part, to refine a position fix, offer a better or alternate pedestrian navigation route, or the like. In some instances, handover of one or more positioning parameters may, for example, be terminated if it is detected or determined that a vehicle has exited a certain range (e.g., set via a geofence, etc.) to a final destination (e.g., a change of plans, etc.).

As another illustration, if it is detected, however, that a vehicle, while within a set range to a final destination, has been driven at a low speed, stopped within 10 meters of a traffic light, stop sign, stop light, etc., and a passenger door has been opened, it may be determined that a threshold for a confidence-in-parking level for the vehicle has not been met, or:

$$20\% + 10\% + (-20\%) + 25\% = 35\% \text{ (threshold)}$$

This scenario may, for example, indicate that a passenger of a vehicle may have been picked up or dropped off (e.g., to get a seat at a movie theater, table at a restaurant, etc.), for example, rather than that the vehicle has parked or is about to be parked at a sub destination, just to illustrate one possibility.

Thus, for this example, since a threshold has not been met, triggering or initiating handover of one or more positioning parameters may not be suitable or otherwise useful. As such, a PND may, for example, reset assessment of a confidence-in-parking level, such as to monitor for future events occurring in or at an associated vehicle. Events may be monitored, such as to assess a confidence-in-parking level, for example, periodically, with certain time intervals, or otherwise as suitable or desired. Of course, details relating to assessment of a confidence-in-parking level, parameters, or threshold are intended as merely examples to which claimed subject matter is not limited. It should be appreciated that, virtually without limit, any of a variety of possible other statistical measures or metrics may be utilized to assess a confidence-in-parking level, such as, for example, a median, a mean, a mode, a percentile of mean, a number of instances, a ratio, a rate, a frequency, an entropy, mutual information, a division, a difference, etc., or any combination thereof.

Continuing with process 200 of FIG. 2, at operation 206, geographic coordinates of a sub destination (e.g., a location of a parking spot, etc.) may, for example, be maintained in some manner or stored in memory of a PND, mobile device, or any combination thereof. For example, a parking spot may be stored on a mobile device as a "favorite location," just to illustrate one possible implementation. As indicated at operation 208, maintained or stored geographic coordinates of a sub destination may be subsequently accessed to enable a mobile device to navigate movement of the mobile device from a final destination (e.g., final destination 306 of FIG. 3, etc.) to a sub destination (e.g., parking spot 308, 310, etc. of FIG. 3, etc.). For example, upon suitable user input, a navigation application may be launched on a mobile device associated with a user so as to provide navigation instructions to allow the user to easily return back a vehicle via a pedestrian navigation route (e.g., route 314, 316, etc. of FIG. 3, etc.).

Figure 4:
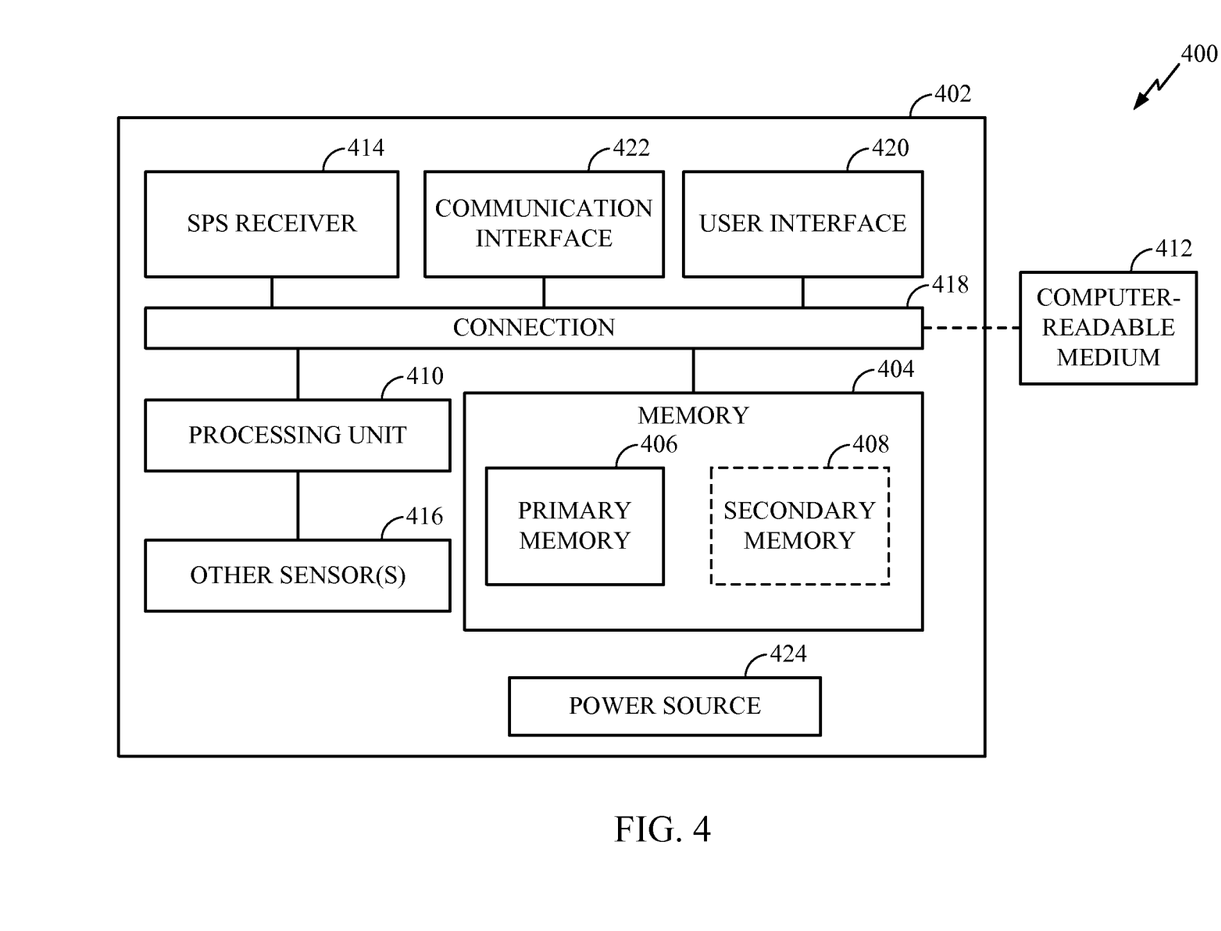
FIG. 4 is a schematic diagram illustrating an implementation of an example computing environment associated with a PND.

FIG. 4 is a schematic diagram illustrating an implementation of an example computing environment 400 that may include one or more mobile devices capable of partially or substantially implementing or supporting one or more operations or processes for automatic or more dynamic handover of one or more positioning parameters from a PND to a mobile device, such as capable of being employed by a pedestrian user, for example. As previously mentioned, one or more mobile devices of FIG. 4 may comprise an in-vehicle PND, location-aware mobile device featuring a navigation capability, such as smart telephone, for example, or the like. It should be appreciated that all or part of various devices shown in computing environment 400, processes, or methods, as described herein, may be implemented using various hardware, firmware, or any combination thereof along with software.

Example computing environment 400 may comprise, for example, a mobile device 402 that may include one or more features or aspects of in-vehicle PND 102a of FIG. 1, though claimed subject matter is not so limited. For example, mobile device 402 may be capable of communicating with one or more other devices, mobile or otherwise, via a cellular telephone network, the Internet, mobile ad-hoc network, wireless sensor network, satellite or like network, or the like. In an implementation, mobile device 402 may be representative of any electronic or computing device, machine, appliance, or platform that may be capable of exchanging information over any suitable network. For example, mobile device 402 may include one or more computing devices or platforms associated with, for example, cellular telephones, satellite telephones, smart telephones, personal digital assistants (PDAs), laptop computers, personal entertainment systems, e-book readers, tablet personal computers (PC), personal audio or video devices, personal navigation devices, or the like. In certain example implementations, mobile device 402 may take the form of one or more integrated circuits, circuit boards, or the like that may be operatively enabled for use in another device. Thus, unless stated otherwise, to simplify discussion, various functionalities, elements, components, etc. are described below with reference to mobile device 402 may also be applicable to other devices not shown so as to support one or more processes associated with example computing environment 400.

Although not shown, optionally or alternatively, there may be additional devices, mobile or otherwise, communicatively coupled to mobile device 402 to facilitate or otherwise support one or more processes associated with computing environment 400, such as discussed above. For example, computing environment 400 may include various computing or communication resources or devices capable of obtaining all or part of suitable position or location information, geofence-related information, navigation-related information, driving-related information, safety information, vehicle performance information, etc. based, at least in part, on one or more wireless signals associated with a positioning system, location-based service, cellular or like communications network, or the like. Location information may, for example, be stored in some manner in memory 404 along with other suitable or desired information, such as one or more parameters for a geofence or vehicle, positioning parameters, thresholds, predefined numerical values, or the like.

Memory 404 may represent any suitable information storage medium. For example, memory 404 may include a primary memory 406 and a secondary memory 408. Primary memory 406 may include, for example, a random access memory, read only memory, etc. While illustrated in this example as being separate from a processing unit 410, it should be appreciated that all or part of primary memory 406 may be provided within or otherwise co-located/coupled with processing unit 410. Secondary memory 408 may include, for example, the same or similar type of memory as primary memory or one or more information storage devices or systems, such as, for example, a disk drive, an optical disc drive, a tape drive, a solid state memory drive, etc. In certain implementations, secondary memory 408 may be operatively receptive of, or otherwise enabled to be coupled to, a computer-readable medium 412.

Computer-readable medium 412 may include, for example, any medium that may store or provide access to information, code or instructions (e.g., an article of manufacture, etc.) for one or more devices associated with computing environment 400. For example, computer-readable medium 412 may be provided or accessed by processing unit 410. As such, in certain example implementations, the methods or apparatuses may take the form, in whole or part, of a computer-readable medium that may include computer-implementable instructions stored thereon, which may be executed by at least one processing unit or other like circuitry so as to enable processing unit 410 or the other like circuitry to perform all or portions of a location determination processes, executing navigation applications, or any processes to facilitate or support one or more operations or techniques discussed herein. In certain example implementations, processing unit 410 may be capable of performing or supporting other functions, such as geofence breach detection, communications, video gaming, or the like.

It should be understood that a storage medium, such as memory 404, computer-readable medium 412, etc. may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signals representative of information, in whole or in part, in the form of zeros may change a state to represent information, in whole or in part, as binary digital electrical signals in the form of ones, to illustrate one possible implementation. As such, "non-transitory" may refer, for example, to any medium or device remaining tangible despite this change in state.

Processing unit 410 may be implemented in hardware or a combination of hardware and software. Processing unit 410 may be representative of one or more circuits capable of performing at least a portion of information computing technique or process. By way of example but not limitation, processing unit 410 may include one or more processors, controllers, microprocessors, microcontrollers, application specific integrated circuits, digital signal processors, programmable logic devices, field programmable gate arrays, or the like, or any combination thereof. Thus, at times, processing unit 410 may comprise, for example, or be representative of means for executing one or more navigation applications to direct movement of a personal navigation device (PND) co-located with a vehicle to a final destination; and means for handing over to a mobile device, at a sub destination, one or more positioning parameters to enable the mobile device to navigate movement of the mobile device from the sub destination to the final destination, the handing over is being triggered in response to a determination that the vehicle has parked, such as discussed above with respect to various example implementations. In some instances, processing unit 410 may comprise, for example, or be representative of means for maintaining geographic coordinates of a sub destination in memory of a PND or mobile device. In at least one implementation, processing unit 410 may comprise, for example, or be representative of means for accessing maintained geographic coordinates of a sub destination to enable a mobile device to navigate movement of the mobile device from a final destination to the sub destination.

Mobile device 402 may include various sensors, components, or circuitry, such as, for example, an SPS receiver 414 capable of acquiring wireless signals from a satellite positioning system (SPS), such as the global positioning system (GPS) or other like Global Navigation Satellite System (GNSS), cellular base station, location beacon, or the like. Mobile device 402 may include one or more other sensors 416, such as, for example, an accelerometer, magnetometer, ambient light detector, camera imager, microphone, temperature sensor, atmospheric pressure sensor, etc. to facilitate or otherwise support one or more processes associated with computing environment 400. For example, one or more of sensors 416 may provide analog or digital signals to processing unit 410. Sensors 416 may also include a location-tracking unit that may initiate a position fix of mobile device 402, such as with respect to a sub destination, final destination, geofence, etc., based, at least in part, on one or more received or acquired wireless signals, such as from an SPS, cellular or like communications network, or the like. In some implementations, a location-tracking unit may be at least partially integrated with a suitable processing unit, such as processing unit 410, for example, though claimed subject matter is not so limited.

Mobile device 402 may include one or more connections 418 (e.g., buses, lines, conductors, optic fibers, etc.) to operatively couple various circuits together, and a user interface 420 (e.g., display, touch screen, keypad, buttons, knobs, microphone, speaker, trackball, information port, etc.) to receive user input, facilitate or support programming or inputting a final or sub destination, defining a geofence, provide information to a user (e.g., a notification, etc.), or the like. Mobile device 402 may further include a communication interface 422 (e.g., wireless transmitter or receiver, modem, antenna, etc.) to allow for communication with one or more other devices or systems over one or more suitable communications networks, as was also indicated. Although not shown, it should be noted that mobile device 402 may include an analog-to-digital converter (ADC) for digitizing analog signals, such as from appropriate buffers, sensors, components, etc. Optionally or alternatively, such buffers, sensors, components, etc. may include a designated (e.g., an internal, etc.) ADC(s) to digitize applicable signals, although claimed subject matter is not so limited.

In an implementation, mobile device 402 may include a power source 424 to provide power to some or all of the sensors, components, or circuitry. Power source 424 may be a portable power source, such as a battery, for example, or may comprise a fixed power source, such as an outlet (e.g. in a house, electric charging station, etc.) or connection (e.g., wired, factory-embedded, etc.). It should be appreciated that power source 424 may be integrated into (e.g., built-in, etc.) or supported by (e.g., stand-alone, etc.) mobile device 402. Although not shown, mobile device 402 may also include a memory or information buffer to collect suitable or desired information, such as, for example, one or more positioning parameters, information representative of a state of a vehicle or one or more final destination metrics, geofence or vehicle-related parameters, predefined numerical values, or the like.

Figure 5:
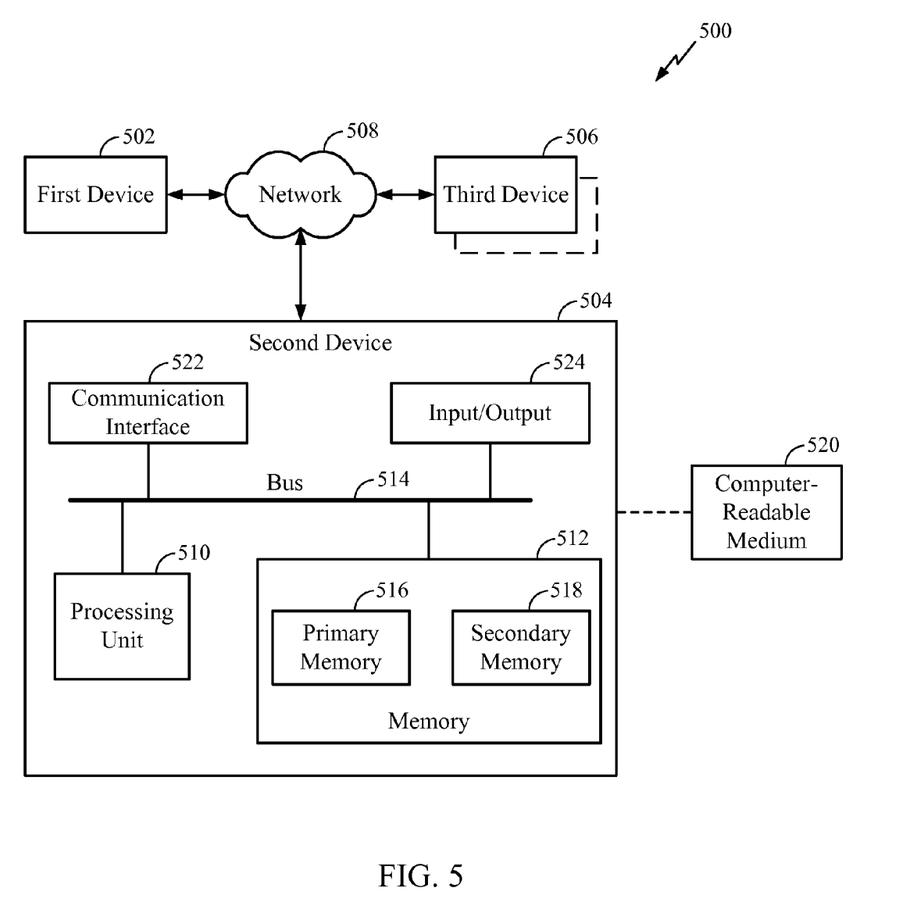
FIG. 5 is a schematic diagram illustrating an implementation of an example computing environment associated with a server.

FIG. 5 is a schematic diagram illustrating an implementation of an example computing environment 500 that may include one or more servers or other devices capable of partially or substantially implementing or supporting one or more operations or processes for automatic or more dynamic handover of one or more positioning parameters from a navigation device, such as an in-vehicle PND, for example, to a mobile device, such as discussed above in connection with FIGS. 1-3, for example. Computing environment 500 may include, for example, a first device 502, a second device 504, a third device 506, etc., which may be operatively coupled together via a communications network 508.

First device 502, second device 504, or third device 506 may be representative of any device, appliance, platform, or machine that may be capable of exchanging information over communications network 508. By way of example but not limitation, any of first device 502, second device 504, or third device 506 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 502, 504, and 506, respectively, may comprise one or more of a mobile device, wireless transmitter or receiver, server, etc. in accordance with example implementations described herein.

In an implementation, communications network 508 may be representative of one or more communication links, processes, or resources capable of supporting an exchange of information between at least two of first device 502, second device 504, or third device 506. By way of example but not limitation, communications network 508 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 506, there may be additional or like devices operatively coupled to communications network 508, mobile or otherwise. It is also recognized that all or part of various devices or networks shown in computing environment 500, or processes or methods, as described herein, may be implemented using or otherwise including hardware, firmware, software, or any combination thereof.

By way of example but not limitation, second device 504 may include at least one processing unit 510 that may be operatively coupled to a memory 512 via a bus 514. Processing unit 510 may be representative of one or more circuits capable of performing at least a portion of a suitable computing procedure or process. For example, processing unit 510 may include one or more processors, controllers, microprocessors, microcontrollers, application specific integrated circuits, digital signal processors, programmable logic devices, field programmable gate arrays, or the like, or any combination thereof. Although not shown, second device 504 may include a location-tracking unit that may initiate a position fix of a suitable mobile device, such as a PND, for example, based, at least in part, on one or more received or acquitted wireless signals, such as from an SPS, cellular or like wireless communications network, or the like. In some implementations, a location-tracking unit may be at least partially integrated with a suitable processing unit, such as processing unit 510, for example, though claimed subject matter is not so limited. In certain server-based or server-supported implementations, processing unit 510 may comprise, for example, or be representative of means for executing one or more navigation applications to direct movement of a personal navigation device (PND) co-located with a vehicle to a final destination; and means for handing over to a mobile device, at a sub destination, one or more positioning parameters to enable the mobile device to navigate movement of the mobile device from the sub destination to the final destination, the handing over is being triggered in response to a determination that the vehicle has parked, as illustrated in or described with respect to operations 202-204 of FIG. 2. In some instances, processing unit 510 may comprise, for example, or be representative of means for maintaining geographic coordinates of a sub destination in memory of a PND or mobile device, as illustrated via operation 206 of FIG. 2. In at least one implementation, processing unit 510 may comprise, for example, or be representative of means for accessing maintained geographic coordinates of a sub destination to enable a mobile device to navigate movement of the mobile device from a final destination to the sub destination, as illustrated in or described at operation 208 of FIG. 2.

Memory 512 may be representative of any information storage mechanism or appliance. Memory 512 may include, for example, a primary memory 516 and a secondary memory 518. Primary memory 516 may include, for example, a random access memory, read only memory, etc. While illustrated in this example as being separate from processing unit 510, it should be understood that all or part of primary memory 516 may be provided within or otherwise co-located/coupled with processing unit 510. Secondary memory 518 may include, for example, same or similar type of memory as primary memory or one or more information storage devices or systems, such as, for example, a disk drive, an optical disc drive, a tape drive, a solid state memory drive, etc. In certain implementations, secondary memory 518 may be operatively receptive of, or otherwise configurable to couple to, a computer-readable medium 520. Computer-readable medium 520 may include, for example, any non-transitory storage medium that may carry or make accessible information, code, or instructions for one or more of devices in computing environment 500. Computer-readable medium 520 may also be referred to as a storage medium.

Second device 504 may include, for example, a communication interface 522 that may provide for or otherwise support an operative coupling of second device 504 to at least communications network 508. By way of example but not limitation, communication interface 522 may include a network interface device or card, a modem, a router, a switch, a transceiver, and the like. Second device 504 may also include, for example, an input/output device 524. Input/output device 524 may be representative of one or more devices or features that may be configurable to accept or otherwise introduce human or machine inputs, or one or more devices or features that may be capable of delivering or otherwise providing for human or machine outputs. By way of example but not limitation, input/output device 524 may include an operatively configured display, speaker, keyboard, mouse, trackball, touch screen, information port, or the like.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform functions described herein. Any machine readable medium tangibly embodying instructions may be used in implementing methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of information as expressed by a particular state of the storage media. For example, an electronic signal representative of information may be "stored" in a portion of the storage media (e.g., memory) by affecting or changing the state of such portions of the storage media to represent information as binary information (e.g., via ones and zeros). As such, in a particular implementation, such a change of state of the portion of the storage media to store a signal representative of information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to store desired program code in the form of instructions or information structures and that may be accessed by a computer or processor thereof. Disk and disc, as used herein, includes compact disc (CD), laser disc, optical disc, digital versatile disc (DVD), floppy disk and blue-ray disc where disks usually reproduce information magnetically, while discs reproduce information optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rdGeneration Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In an implementation, a mobile device may, for example, be capable of communicating with one or more femtocells, such as for the purpose of estimating its location, handing over one or more positioning parameters, detecting a geofence breach, communicating with a suitable server, or the like. As used herein, "femtocell" may refer to one or more smaller-size cellular base stations that may be capable of detecting a wireless signal transmitted from a mobile device using one or more appropriate techniques. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example. However, such details relating to femtocells are merely examples, and claimed subject matter is not so limited.

Also, if applicable, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or"

if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising:
   processing one or more digital signals to execute one or more navigation applications to direct movement of a personal navigation device (PND) comprising at least a communication interface and a processing unit coupled to a memory co-located with a vehicle to a final destination; and
   prior to reaching a sub destination and placing said vehicle in park, handing over to a mobile device one or more positioning parameters encoded as physical states in said memory to enable said mobile device to navigate movement of said mobile device from said sub destination to said final destination, said handing over being triggered in response to a determination that said vehicle is about to be parked and being performed by transmitting one or more signals representative of said encoded physical quantities via a communication link established between said PND and said mobile device utilizing, at least in part, said communication interface.

2. The method of claim 1, and further comprising:
   assessing a confidence-in-parking level for said vehicle; and
   initiating said handing over to said mobile device said one or more positioning parameters in response of said confidence-in-parking level meeting a threshold.

3. The method of claim 2, wherein said assessing said confidence-in-parking level comprises:
   weighting a state of said vehicle and a final destination metric; and
   combining said weighted state of said vehicle and said final destination metric to determine if said confidence-in-parking level meets said threshold.

4. The method of claim 3, wherein said weighting comprises determining whether said state of said vehicle or said final destination metric satisfies at least one parameter corresponding to a predefined numerical value.

5. The method of claim 4, wherein said predefined numerical value is expressed via a percent value.

6. The method of claim 4, wherein said predefined numerical value comprises a negative numerical value.

7. The method of claim 4, wherein said at least one parameter comprises at least one of the following: a set range of said PND to said final destination; a set range of said vehicle to one or more of a traffic light and a traffic sign; a reverse direction of travel of said vehicle; a low speed of travel of said vehicle; a stationary state of said vehicle; a non-operational state of an engine of said vehicle; an open position of a driver's door of said vehicle; an open position of a passenger's door of said vehicle; an application of a parking brake of said vehicle; or any combination thereof.

8. The method of claim 7, wherein said set range of said PND to said final destination is set via a geofence indicative of an acceptable walking distance to said final destination.

9. The method of claim 1, wherein said one or more positioning parameters comprise at least one of the following: geographic coordinates of said final destination; geographic coordinates of said sub destination; an estimate of time; ephemeris data; satellite positioning system (SPS) almanac data; a proposed route from said sub destination to said final destination; navigation details; a notification that said PND is within an acceptable walking distance to said final destination; or any combination thereof.

10. The method of claim 1, and further comprising:
    displaying indications of one or more parking spaces; and
    receiving selection of one of said displayed indications as said sub destination.

11. The method of claim 1, wherein said handing over is further triggered in response to a user selection received at a user interface of at least one of the following: said PND; said mobile device; or any combination thereof.

12. The method of claim 11, wherein said user selection comprises at least one of the following: a voice command; selection via a touch screen; a detected user gesture; or any combination thereof.

13. The method of claim 1, and further comprising maintaining geographic coordinates of said sub destination in memory of at least one of the following: said PND; said mobile device; or any combination thereof.

14. The method of claim 13, and further comprising accessing said maintained geographic coordinates of said sub destination to enable said mobile device to navigate movement of said mobile device from said final destination to said sub destination.

15. The method of claim 1, and further comprising
    determining whether said vehicle has exited a set range to said final destination; and
    terminating said handing over to said mobile device said one or more positioning parameters in response to said determination.

16. An apparatus comprising:
    a communication interface to communicate with a mobile device; and
    at least one processor programmed with instructions to:
       execute one or more navigation applications to direct movement of a personal navigation device (PND) co-located with a vehicle to a final destination; and
       prior to reaching a sub destination and placing said vehicle in park, hand over to said mobile device one or more positioning parameters to enable said mobile device to navigate movement of said mobile device from said sub destination to said final destination, said handing over being triggered in response to a determination that said vehicle is about to be parked.

17. The apparatus of claim 16, wherein said at least one processor further programmed with instructions to:
    assess a confidence-in-parking level for said vehicle; and
    initiate said handing over to said mobile device said one or more positioning parameters in response of said confidence-in-parking level meeting a threshold.

18. The apparatus of claim 17, wherein said instructions to said assess said confidence-in-parking level further comprise instructions to:

weight a state of said vehicle and a final destination metric; and combine said weighted state of said vehicle and said final destination metric to determine if said confidence-in-parking level meets said threshold.

19. The apparatus of claim 18, wherein said instructions to weight further comprise instructions to determine whether said state of said vehicle or said final destination metric satisfies at least one parameter that corresponds to a predefined numerical value.

20. The apparatus of claim 19, wherein said at least one parameter comprises at least one of the following: a set range of said PND to said final destination; a set range of said vehicle to one or more of a traffic light and a traffic sign; a reverse direction of travel of said vehicle; a low speed of travel of said vehicle; a stationary state of said vehicle; a nonoperational state of an engine of said vehicle; an open position of a driver's door of said vehicle; an open position of a passenger's door of said vehicle; or any combination thereof.

21. The apparatus of claim 20, wherein said set range of said PND to said final destination is set via a geofence indicative of an acceptable walking distance to said final destination.

22. An apparatus comprising:
means for executing one or more navigation applications to direct movement of a personal navigation device (PND) co-located with a vehicle to a final destination; and
means for handing over to a mobile device, prior to reaching a sub destination and placing said vehicle in park, one or more positioning parameters to enable said mobile device to navigate movement of said mobile device from said sub destination to said final destination, said handing over being triggered in response to a determination that said vehicle is about to be parked.

23. The apparatus of claim 22, and further comprising:
means for assessing a confidence-in-parking level for said vehicle; and
means for initiating said handing over to said mobile device said one or more positioning parameters in response of said confidence-in-parking level meeting a threshold.

24. The apparatus of claim 23, wherein said means for assessing said confidence-in-parking level comprises:
means for weighting a state of said vehicle and a final destination metric; and
means for combining said weighted state of said vehicle and said final destination metric to determine if said confidence-in-parking level meets said threshold.

25. The apparatus of claim 22, wherein said means for weighting comprises means for determining whether said state of said vehicle or said final destination metric satisfies at least one parameter corresponding to a predefined numerical value.

26. The apparatus of claim 25, wherein said at least one parameter comprises at least one of the following: a set range of said PND to said final destination; a set range of said vehicle to one or more of a traffic light and a traffic sign; a reverse direction of travel of said vehicle; a low speed of travel of said vehicle; a stationary state of said vehicle; a nonoperational state of an engine of said vehicle; an open position of a driver's door of said vehicle; an open position of a passenger's door of said vehicle; an application of a parking brake of said vehicle; or any combination thereof.

27. The apparatus of claim 26, wherein said set range of said PND to said final destination is set via a geofence indicative of an acceptable walking distance to said final destination.

28. The apparatus of claim 22, wherein said one or more positioning parameters comprise at least one of the following: geographic coordinates of said final destination; geographic coordinates of said sub destination; an estimate of time; ephemeris data; satellite positioning system (SPS) almanac data; a proposed route from said sub destination to said final destination; navigation details; a notification that said PND is within an acceptable walking distance to said final destination; or any combination thereof.

29. The apparatus of claim 22, and further comprising means for maintaining geographic coordinates of said sub destination in memory of at least one of the following: said PND; said mobile device; or any combination thereof.

30. The apparatus of claim 29, and further comprising means for accessing said maintained geographic coordinates of said sub destination to enable said mobile device to navigate movement of said mobile device from said final destination to said sub destination.

31. The apparatus of claim 22, and further comprising
means for determining whether said vehicle has exited a set range to said final destination; and
means for terminating said handing over to said mobile device said one or more positioning parameters in response to said determination.

32. An article comprising:
a non-transitory storage medium having instructions stored thereon executable by a special purpose computing platform to:
execute one or more navigation applications to direct movement of a personal navigation device (PND) co-located with a vehicle to a final destination; and
prior to reaching a sub destination and placing said vehicle in park, hand over to a mobile device one or more positioning parameters to enable said mobile device to navigate movement of said mobile device from said sub destination to said final destination, said handing over being triggered in response to a determination that said vehicle is about to be parked.

33. The article of claim 32, wherein said storage medium further comprises instructions to:
assess a confidence-in-parking level for said vehicle; and
initiate said handing over to said mobile device said one or more positioning parameters in response of said confidence-in-parking level meeting a threshold.

34. The article of claim 33, wherein said storage medium having said instructions to said assess said confidence-in-parking level further comprises instructions to:
weight a state of said vehicle and a final destination metric; and
combine said weighted state of said vehicle and said final destination metric to determine if said confidence-in-parking level meets said threshold.

* * * * *